US007222590B2

(12) United States Patent
Haddad (10) Patent No.: US 7,222,590 B2
(45) Date of Patent: May 29, 2007

(54) REMOVABLE LIGHTED ROTATABLE DOG TETHER

(76) Inventor: John A. Haddad, 901 Springfield Rd., East Peoria, IL (US) 61611

( * ) Notice: Subject to any disclaimer, the term of this patent is extended or adjusted under 35 U.S.C. 154(b) by 0 days.

(21) Appl. No.: 11/009,642

(22) Filed: Dec. 10, 2004

(65) Prior Publication Data

US 2005/0132980 A1    Jun. 23, 2005

Related U.S. Application Data

(60) Provisional application No. 60/530,840, filed on Dec. 18, 2003.

(51) Int. Cl.
*A01K 1/04* (2006.01)
(52) U.S. Cl. ..................................... 119/787
(58) Field of Classification Search ................ 119/787, 119/786, 780; 362/152, 153, 153.1, 191, 362/431
See application file for complete search history.

(56) References Cited

U.S. PATENT DOCUMENTS

| 2,360,199 | A | * | 10/1944 | Cawley | 119/786 |
|---|---|---|---|---|---|
| 3,070,068 | A | * | 12/1962 | Chapman | 119/786 |
| 4,620,506 | A | | 11/1986 | Stubbs | |
| 5,353,747 | A | * | 10/1994 | Fain | 119/780 |
| 5,398,180 | A | * | 3/1995 | Lee | 362/431 |
| 5,785,007 | A | * | 7/1998 | Sauber et al. | 119/786 |
| 6,314,916 | B1 | | 11/2001 | Watson, Sr. | |
| 6,318,302 | B1 | * | 11/2001 | Bedient | 119/786 |
| 6,392,541 | B1 | * | 5/2002 | Bucher et al. | 362/431 |
| 6,729,742 | B2 | * | 5/2004 | Wismeth et al. | 362/431 |

OTHER PUBLICATIONS www.okdirectpets.com/store/collars/nite_lite_quick_snap.jsp, Kennel Tested Pet Supplies, *Nite Lite Quick Snap Collars*, pp. 1-3, 2004.
www.roccorp/com/anchor, Stakes and anchors, *Strength and Security Tested Prestige, States and Anchors*, pp. 1-2; *Pet Tethers for Special Needs*, Like Travel!, p. 1, 2004.
http://yourdogcollar.com/duraglo, Dog Collars, *Glow in the Dark Dog Collars*, pp. 1-2, 2004.
www.polsteins/com/dometopstake, Canine County Dome top Stake—Dog Tie Outs, p. 1, 2004.
www.uniquedistributors.com/unhunlig. *Dog Hunting Supply*: Coon Hunting Lights, Dog Light, Night Hunting, Spotlight, Varmin . . . , pp. 1-2, 2004.
www.pet-dog-cat-supply-store.com, Dog Runners, Tie-Outs, Trolleys, Discount Supplies for Dog, *Greg Robert Quality Pet Suppliers*, pp. 1-4, 2004.

(Continued)

*Primary Examiner*—Thomas Price
(74) *Attorney, Agent, or Firm*—Husch & Eppenberger LLC; Robert C. Haldiman (57) ABSTRACT

A pet tether including a ground fixation device; a base attached to a ground fixation device, the base being disposed above the ground, a coupling on the base, the coupling being disposed above the ground, a leash bracket, the leash bracket having a leash attachment and the leash bracket having a handle, the handle being constructed to couple and uncouple with the coupling, a housing attached to the leash bracket; and a light mounted in the housing.

20 Claims, 6 Drawing Sheets

OTHER PUBLICATIONS www.petpals.com, Dog, Cat, Bird, Small Pets and Fish Supplies, p. 1, 2004.

www.appma.org, *American Pet Products Manufacturers Association, Inc.*, Current News and News Releases, 2003, pp. 13, 2004.

www.petsafewarehouse.com/customer_info/training, Pet Safe has Dog Bark Collar-Bark Control Barking Dog Problem Solutions, *Training Tips for You and Your Pet*, pp. 1-3, 2004.

www.stayk.com, The Stay K, Stay K Industries, Inc., The StayK, George Hickox, Dog-Pet-Animal Tie-Out, *The Ultimate Pet Tether & Anchor System*, pp. 1-2, 2004.

www.dogtrainingclub.com/shopping/Tie Outs Chains, Dog Tie Outs & Chains, Compare cheap prices and buy, *Dog Training* Club.com, pp. 1-3, 2004.

www.arcatapet.com, Arcata Pet—Pet Supplies—Dog Tie outs, *Arcata Pet*, pp. 1-3, 2004.

www.morrco.com/dogtieouts, Dog Tie Outs, *Morrco Pet Supply*, p. 1, 2004.

\* cited by examiner

REMOVABLE LIGHTED ROTATABLE DOG TETHER

CROSS-REFERENCE TO RELATED APPLICATIONS

This application claims priority to U.S. Provisional Application No. 60/530,840 filed Dec. 18, 2003.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to devices for controlling or handling an animal and, more particularly, to rotatable tether devices.

2. Related Art

Animal restraint devices are well known and widely used. A simple form of restraint is a leash that can be attached to a collar or harness on the animal. A leash usually includes a handle, a lead, and a clip that attaches to the collar.

Oftentimes it is desired to keep an animal tethered to a fixed point with a restraint. For example, in a yard without a fence, it may be desired to tether the animal to keep it from running off the property. Previously, a simple stake or pole in the ground has been used for this purpose. The combination of the restraint and tether provides the animal with some freedom of movement while still keeping the animal within a defined boundary.

Rotatable tethering devices are known. For example, U.S. Pat. No. 4,620,506 issued to Stubbs discloses a rotatable animal tethering device. The device includes a flat bed having four legs that are driven into the ground. A center stake is centered in the bed and is also driven into the ground. The upper end of the stake is threaded and receives a collar. The stake also receives a tube and cylinder assembly. The cylinder has a lug to which the tether of the animal may be secured.

The device disclosed by Stubbs is not lighted such that passerby may trip on the device. Additionally, the device disclosed by Stubbs does not include a detachable handle. A detachable handle would conveniently allow a user to walk the animal without an additional control harness.

Similarly, U.S. Pat. No. 6,314,916 issued to Watson, Sr. discloses a rotary tethering system for tethering an animal. The device includes a bar, a detachable above ground shaft portion, and a rotary tethering assembly. The bar is perpendicular to the below ground stake section. The bar supports the upper detachable above ground shaft portion. The rotary tethering assembly is attached to the above ground shaft portion.

The Watson device does not include a handle for a user to grasp nor does it include a light. A handle would allow a user to walk the animal without the need for an additional control harness. A light would provide the benefit of illuminating the tether.

Thus, there remains a need for a tethering device that is lighted and incorporates a detachable handle.

SUMMARY OF THE INVENTION

It is in view of the above problems that the present invention was developed. The invention is a tethering device for tethering an animal. The tethering device includes a leash bracket for receiving a leash. The leash bracket rotates about a central axis. The tethering device also includes a housing. The housing is adapted to receive a light. The light illuminates at least the tethering device.

The tethering device also includes a handle and a base. The base secures the tethering device to the ground. The handle detachably connects to the base.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
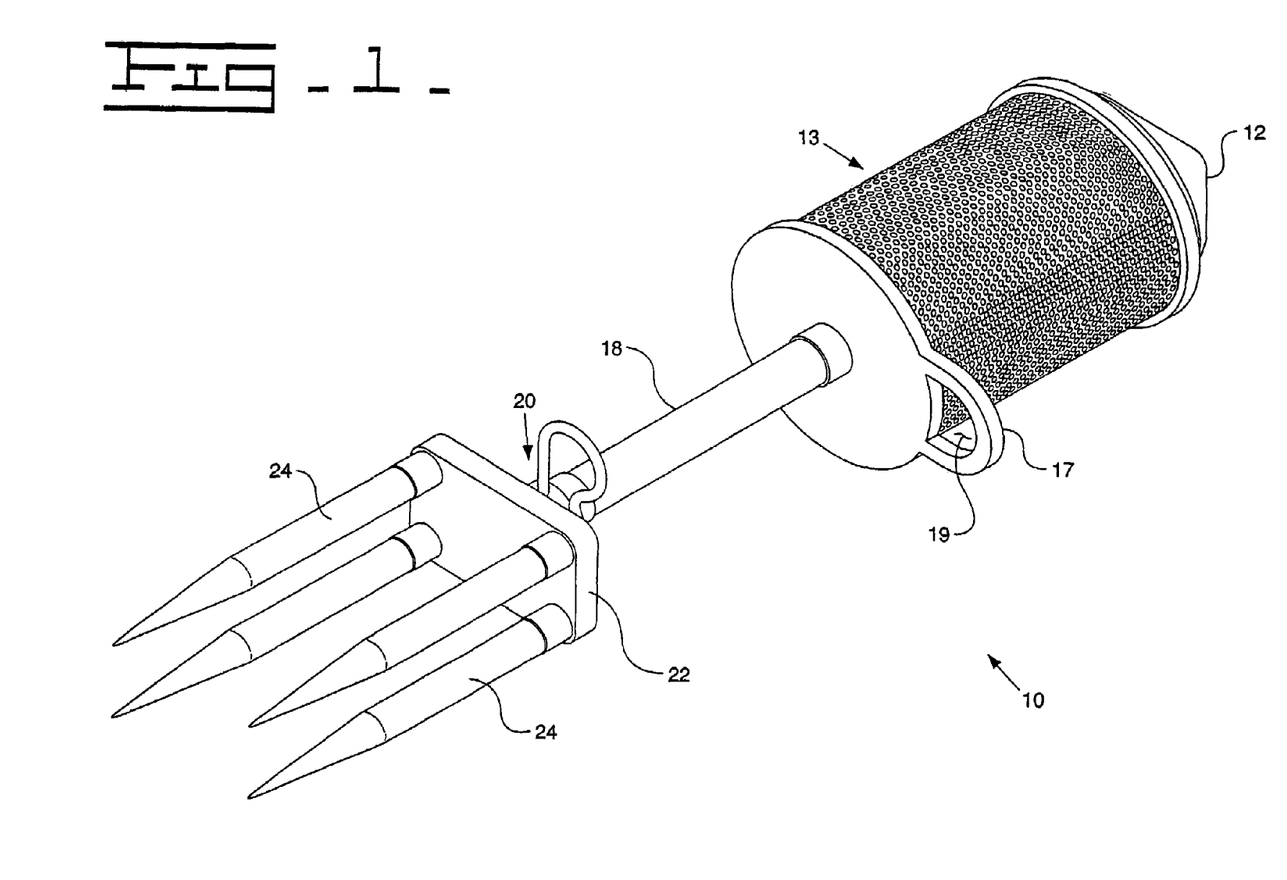
FIG. 1 is a perspective view of the removable lighted rotary tethering device.

Referring to the accompanying drawings in which like reference numbers indicate like elements, FIG. 1 illustrates a tethering device 10. The tethering device includes a housing 13. The housing 13 is made from perforated sheet metal in the depicted embodiment, but other materials may be used. The housing 13 is adapted to receive a light 12. In the depicted embodiment, the light 12 is a solar-powered rechargeable light as disclosed in U.S. Pat. No. 5,041,952, herein incorporated by reference. A leash bracket 17 is operatively connected to the housing 13. The leash bracket 17 includes a hole 19 for securing a leash (not shown) to the tethering device 10. A handle 18 is operatively connected to the leash bracket 17. In the depicted embodiment, the handle 18 includes a soft cushion grip. The tethering device 10 also includes a base 22. A coupling 20 connects the handle 18 to the base 22. As an example, in the depicted embodiment the coupling 20 is shown as a receptacle with a through hole and a pin is placed in the through hole to secure the handle 18. A plurality of stakes 24 is operatively connected to the base 22. In the depicted embodiment, the base 22 includes a pedestal 23 (best seen in FIG. 2) for each stake. In some embodiments, the pedestal 23 and the stake 24 may have a threaded engagement. For example, each pedestal 23 may include internal threading for receiving a threaded end of a stake 24. The stakes 24 are for securing the tethering device 10 to the ground (not shown). In the depicted embodiment, the stakes 24 are about nine inches (221 mm) long.

Figure 2:
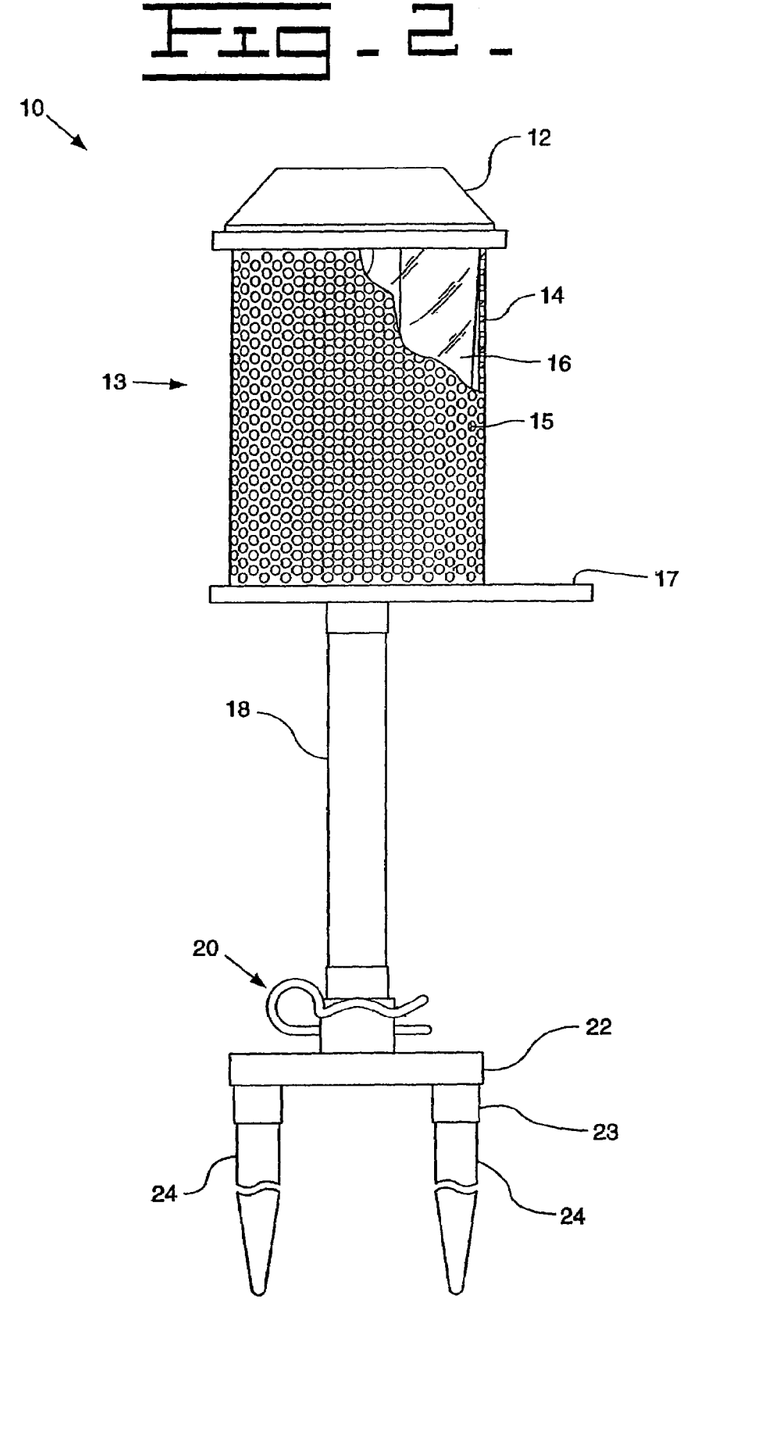
FIG. 2 is a side view of the removable lighted rotary tethering device.

FIG. 2 illustrates a side view of the tethering device 10. The tethering device 10 includes the light 12. The light 12 includes a lens 16. The lens 16 reflects light for better illumination. The lens 16 fits within a cylinder wall 14 of the housing 13. The cylinder wall 14 includes perforations 15. The perforations allow light rays from the light 12 to pass through the cylinder wall 14.

In the embodiments depicted in FIGS. 1 and 2, the housing 13 and the leash bracket 17 rotate in unison about a central axis. However, in other embodiments, the housing 13 is stationary and only the leash bracket 17 rotates. Yet in other embodiments, the leash bracket 17 and the handle 18 rotate in unison about a central axis.

Figure 3:
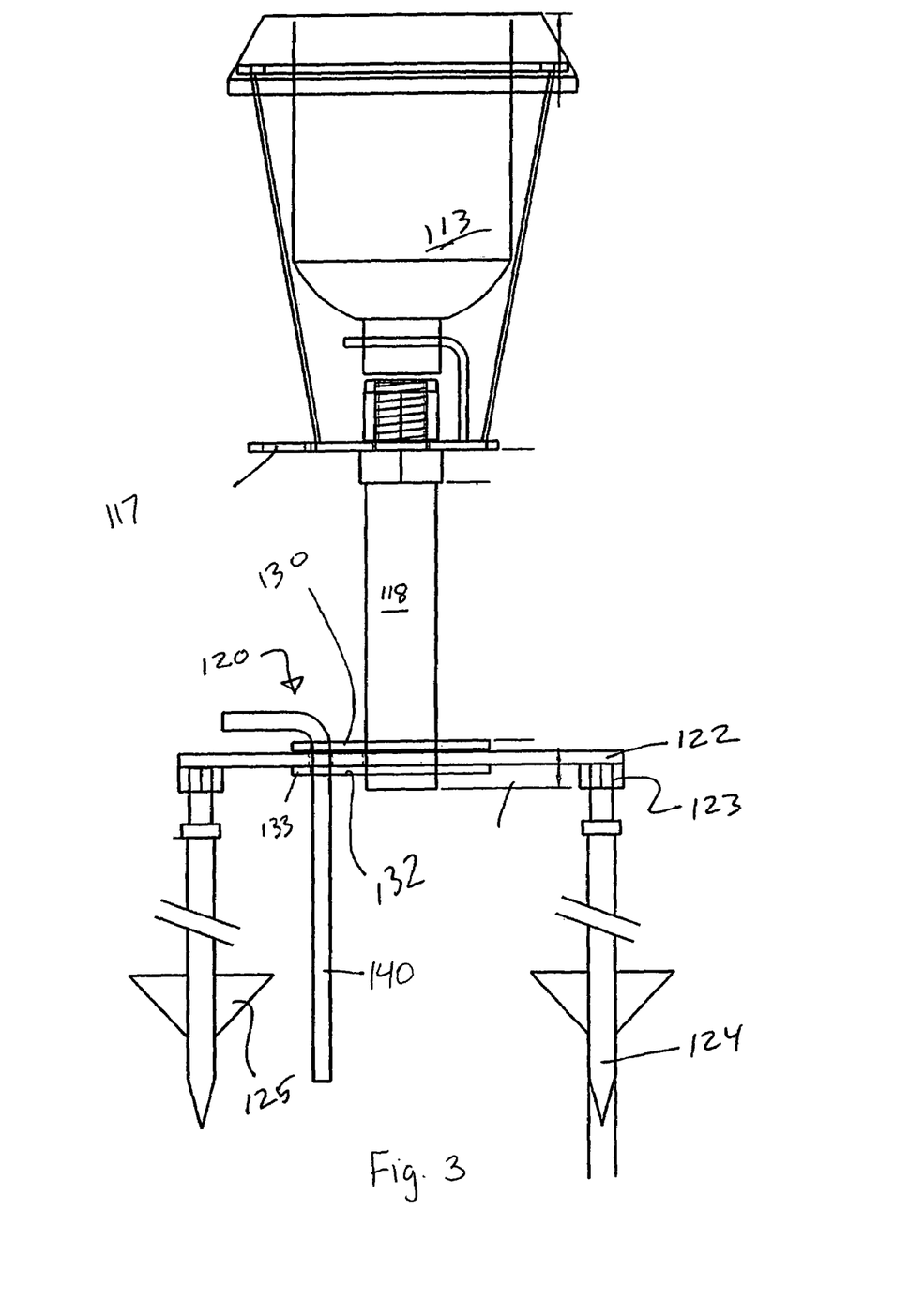
FIG. 3 is a side view of an alternative embodiment.
Figure 4:
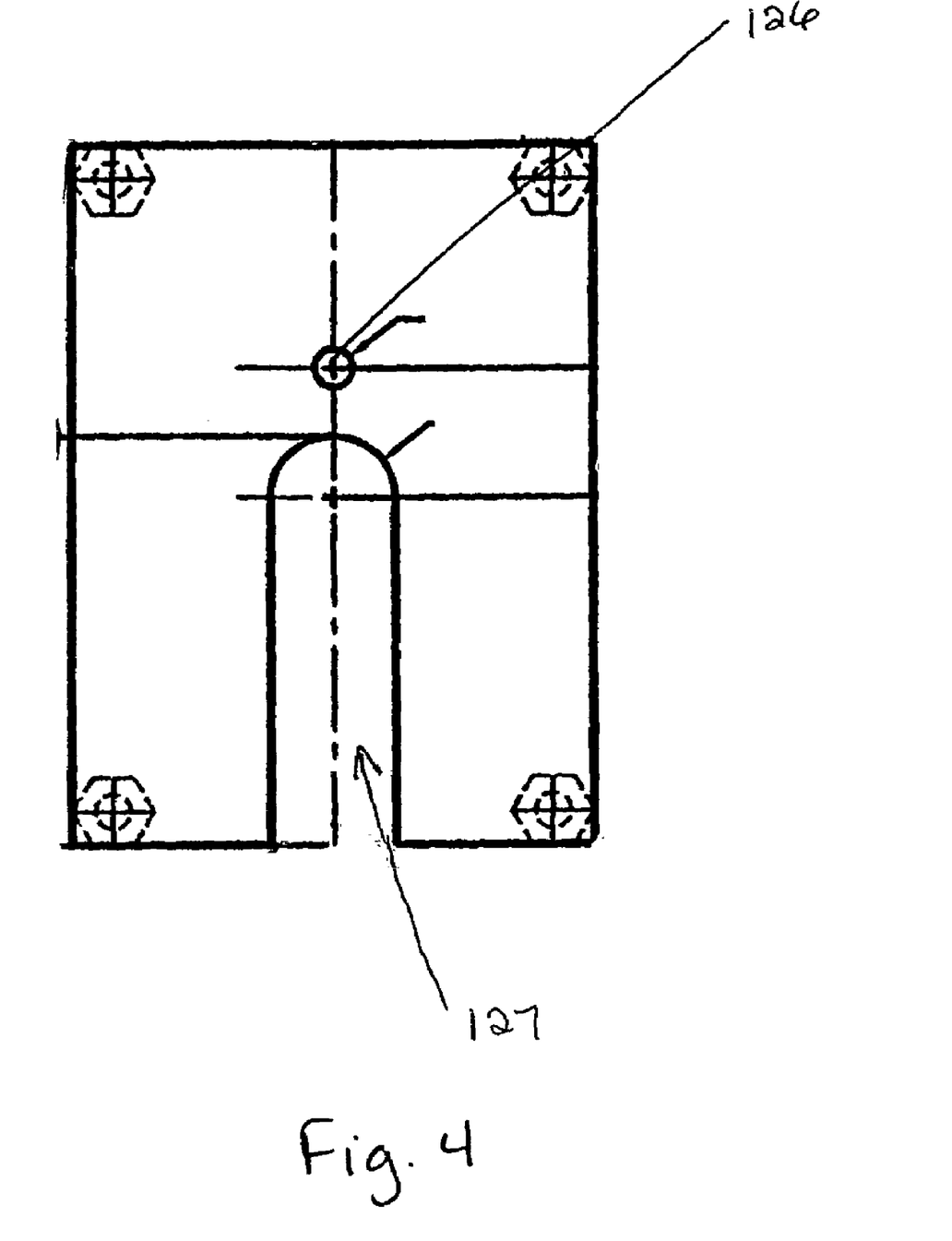
FIG. 4 is a top view of the base.
Figure 5:
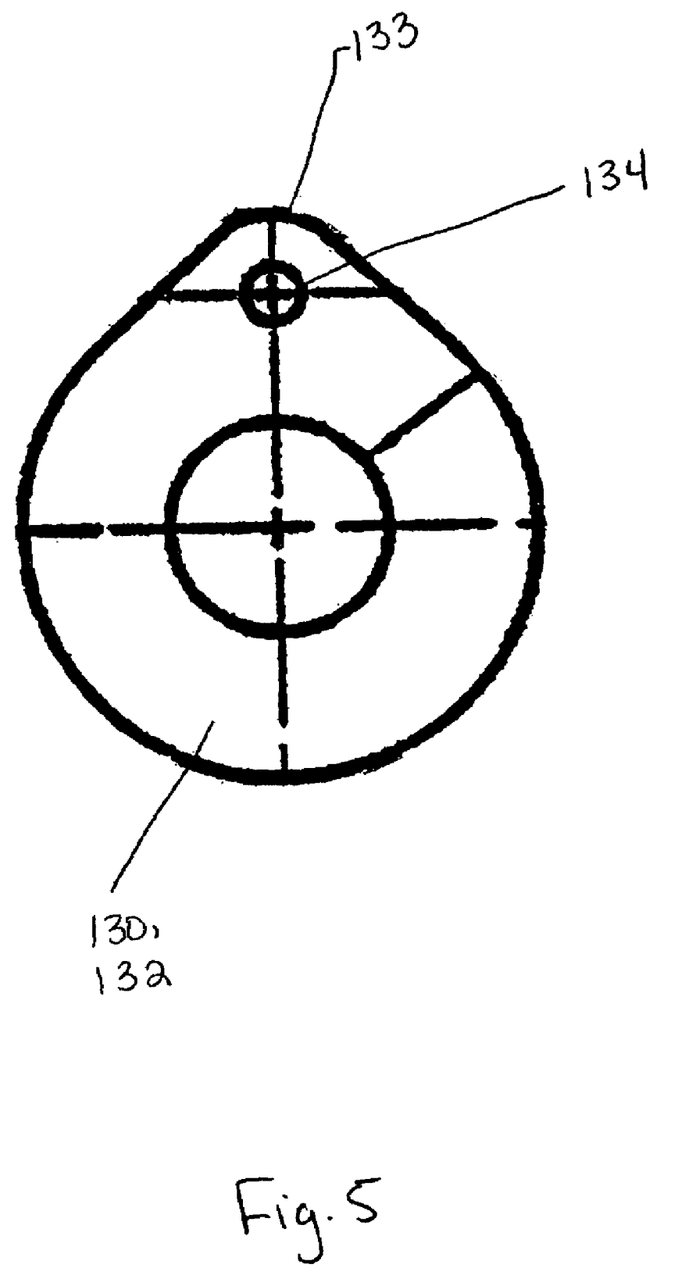
FIG. 5 is a top view of the handle flange.
Figure 6:
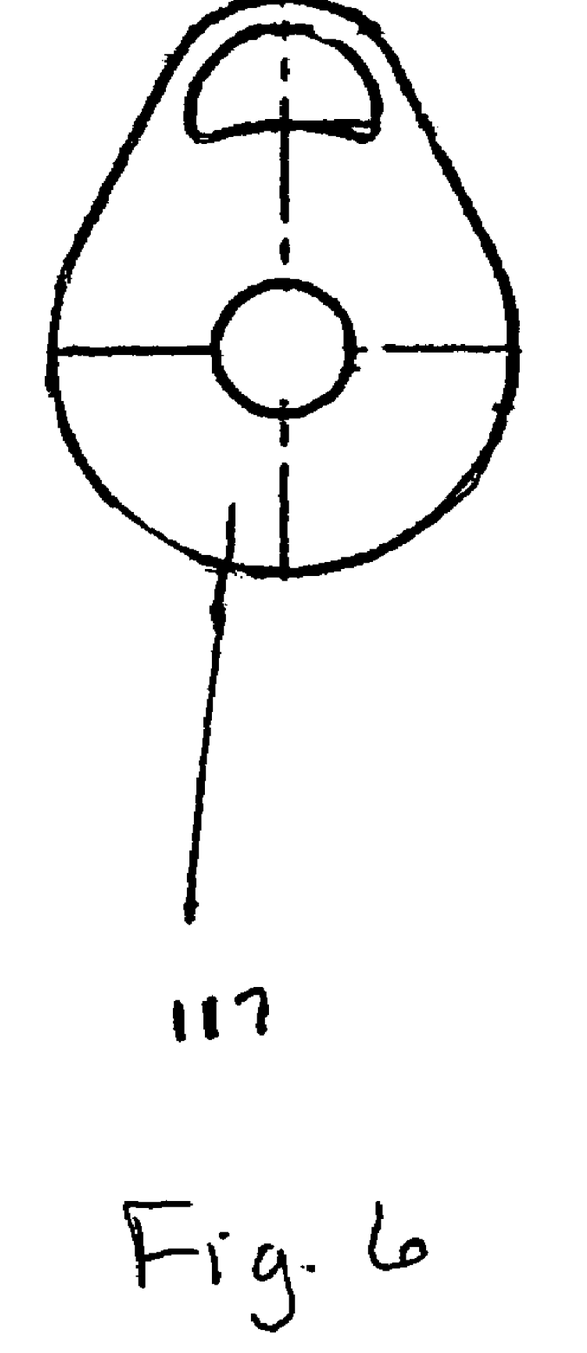
FIG. 6 is a top view of the bracket.

In FIG. 3 an alternative embodiment of the invention is shown. Base 122 has spikes 124 attached to it. The spikes or stakes are four in number in the depicted embodiment and mounted to pedestals 123 which are permanently attached to base 122. The stakes are also shown with anchoring fins 125. As best seen in the top view of the base 122 in FIG. 4, there is a slot 127 and a hole 126 in the base. The slot accommodates insertion of the handle 118. The thickness of the base 122 closely cooperates with handle flanges 130 and 132. At least one of the top and bottom handle flanges 130 and 132 includes an extension 133 with a hole 134 therethrough. Pin 140 may be dropped through hole 134 in the flange(s) and hole 126 in the base 122 in order to secure the dog tether to its fixed station, as for example after the dog has been walked. A leashed bracket 117 is mounted at the top of handle 118. Again there is a light (not shown) in housing 113.

In operation, a user (not shown) connects the stakes 24, 124 to the base 22, 122. The base 22 and the stakes 24 are pushed into the ground. The user grasps the handle 18, 118 and places an end of the handle 18 into the coupling 20, 120. The user attaches one end of a leash to a collar of an animal. The user attaches the other end of the leash to the leash bracket 17, 117. Thereafter, the animal can move about with limited freedom. Additionally, the user can remove the handle 18 from the coupling 20 to walk with the animal. The user grasps the handle to control the animal while walking.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, while the housing is depicted as rotatable, it may be stationary in some embodiments. Thus, the breadth and scope of the present invention should not be limited by any of the above-described exemplary embodiments, but should be defined only in accordance with the following claims appended hereto and their equivalents.

What is claimed is:

1. A pet tether comprising:
   a ground fixation device;
   a base attached to said ground fixation device, said base being disposed above the ground;
   a coupling on said base, said coupling being disposed above the ground;
   a leash bracket, said leash bracket having a leash attachment and said leash bracket having a handle, said handle being constructed to couple and uncouple with said coupling;
   a housing attached to said leash bracket; and
   a light mounted in said housing;
   wherein said ground fixation device is comprised of at least one pedestal fixedly attached to an underside of said base and at least one stake constructed to mount in each of said at least one pedestals.

2. The pet tether of claim 1 wherein said ground fixation device is at least four stakes.

3. The pet tether of claim 1 wherein said coupling includes a cotter pin.

4. The pet tether of claim 1 wherein said leash attachment is comprised of a hole in said leash bracket.

5. The pet tether of claim 1 wherein said housing is perforated.

6. The pet tether of claim 1 wherein said handle includes a soft grip.

7. The pet tether of claim 1 wherein said leash bracket rotates around said handle.

8. A method of assembling a pet tether comprising:
   fabricating a base having a top and bottom, said bottom including a ground fixation device and said top including a coupling;
   assembling a leash bracket with a handle, said handle having a first end and a second end, said first end of said handle being constructed to couple and uncouple with said coupling of said base, and said second end of said handle being attached to said leash bracket, said leash bracket having a lease attachment;
   attaching a housing to said leash bracket said housing being adapted to mount a light therein.

9. The pet tether of claim 8 wherein said ground fixation device is at least one stake.

10. The pet tether of claim 8 wherein said ground fixation device is at least four stakes.

11. The pet tether of claim 8 wherein said ground fixation device is comprised of at least one pedestal fixedly attached to an underside of said base and at least one stake constructed to mount in each of said at least one pedestals.

12. The pet tether of claim 8 wherein said coupling includes a cotter pin.

13. The pet tether of claim 8 wherein said leash attachment is comprised of a hole in said leash bracket.

14. The pet tether of claim 8 wherein said light is solar.

15. The pet tether of claim 8 further comprising a lens for said light.

16. The pet tether of claim 8 wherein said housing is a cylinder.

17. The pet tether of claim 8 wherein said housing is perforated.

18. The pet tether of claim 8 wherein said handle includes a soft grip.

19. The pet tether of claim 8 wherein said leash bracket rotates around said handle.

20. The method of walking a dog comprising:

attaching a leash to a leash attachment on a leash bracket said leash bracket being further attached to a handle;

uncoupling said handle from a coupling attached to a base, said base being attached to a ground fixation device, said ground fixation device being fixed in the ground; and gripping said unattached handle and walking the dog.

* * * * *